(12) United States Patent
Robert et al.

(10) Patent No.: US 11,563,970 B2
(45) Date of Patent: Jan. 24, 2023

(54) METHOD AND APPARATUS FOR GENERALIZED OBMC

(71) Applicant: INTERDIGITAL VC HOLDINGS, INC., Wilmington, DE (US)

(72) Inventors: Antoine Robert, Mézières sur Couesnon (FR); Fabrice Leleannec, Mouaze (FR); Tangi Poirier, Thorignè-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/975,836

(22) PCT Filed: Feb. 22, 2019

(86) PCT No.: PCT/US2019/019073
§ 371 (c)(1),
(2) Date: Aug. 26, 2020

(87) PCT Pub. No.: WO2019/165162
PCT Pub. Date: Aug. 29, 2019

(65) Prior Publication Data
US 2020/0413085 A1 Dec. 31, 2020

(30) Foreign Application Priority Data

Feb. 26, 2018 (EP) .................................... 18305196
Mar. 30, 2018 (EP) .................................... 18305386

(51) Int. Cl.
*H04N 19/513* (2014.01)
*H04N 19/117* (2014.01)
*H04N 19/176* (2014.01)

(52) U.S. Cl.
CPC ......... *H04N 19/513* (2014.11); *H04N 19/117* (2014.11); *H04N 19/176* (2014.11)

(58) Field of Classification Search
CPC .......................... H04N 19/513; H04N 19/117
See application file for complete search history.

(56) References Cited

U.S. PATENT DOCUMENTS 9,807,424 B2 10/2017 Guo et al.
9,883,203 B2 1/2018 Chien et al.
(Continued)

FOREIGN PATENT DOCUMENTS

| CN | 105872559 | 8/2016 |
| WO | WO2016123068 | 8/2016 |
| WO | WO2017195554 | 11/2017 |

OTHER PUBLICATIONS

Algorithm Description of Joint Exploration Test Model 7 (JEM7), 119. MPEG Meeting, Jul. 17, 2017-Jul. 21, 2017, Torino, (Motion Picture Expert Group or ISO/IEC JTC1/SC29/WG11), No. N17055, Oct. 6, 2017.

(Continued)

*Primary Examiner* — Irfan Habib
(74) *Attorney, Agent, or Firm* — Ronald Kolczynski

(57) ABSTRACT

A block of video data that is split into sub-blocks forms a prediction for that sub-block using predictions from neighboring sub-blocks such that a current prediction for the sub-block is combined with weighted versions of the neighboring predictions. The neighboring sub-blocks motion vectors are checked to determine whether they are different than the motion vector of the sub-block being predicted. If so, than that corresponding neighboring sub-block is used to generate the prediction of the current sub-block. In an embodiment, two lines or two columns of pixels within a sub-block are used in forming the prediction for the current sub-block when the size of the block containing the sub-block is under a particular size.

20 Claims, 20 Drawing Sheets

(56) References Cited

U.S. PATENT DOCUMENTS

| | | | | |
|---|---|---|---|---|
| 10,848,785 | B2* | 11/2020 | Sadafale | H04N 19/436 |
| 10,999,594 | B2* | 5/2021 | Hsieh | H04N 19/563 |
| 2012/0287994 | A1* | 11/2012 | Van der Auwera | H04N 19/176 375/E7.243 |
| 2015/0229926 | A1* | 8/2015 | Puri | H04N 19/182 375/240.02 |
| 2016/0080745 | A1* | 3/2016 | Kwak | H04N 19/14 375/240.12 |
| 2016/0119650 | A1* | 4/2016 | Sadafale | H04N 19/436 375/240.24 |
| 2019/0320171 | A1* | 10/2019 | Zhang | H04N 19/577 |
| 2020/0204819 | A1* | 6/2020 | Hsieh | H04N 19/105 |

OTHER PUBLICATIONS

Grecos et al., Beyond the High Efficiency Video Coding Standard: an Overview, Proceedings Optical Diagnostics of Living Cells II, SPIE, US, vol. 10223, May 1, 2017, pp. 102230F-1-102230F-18.

Ahmadianpour et al., Novel Techniques for Reducing Blocking Artifacts in Motion Compensated Frame, Journal of Electronic Imaging, vol. 15, No. 1, 013007, (Jan.-Mar. 2006), pp. 013007-1-013007-8.

Chen et al., Variable Block-Size Overlapped Block Motion Compensation in the Next Generation Open-Souice Video Codec, 2017 IEEE International Conference on Image Processing (ICIP), IEEE, Sep. 17, 2017, pp. 938-942.

\* cited by examiner

METHOD AND APPARATUS FOR GENERALIZED OBMC

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain, proposed in order to represent picture data in a more flexible way in the compressed domain. The advantage of this flexible representation of the coding tree is that it provides increased compression efficiency compared to the CU/PU/TU arrangement of the HEVC standard.

SUMMARY OF THE INVENTION

These and other drawbacks and disadvantages of the prior art are addressed by at least one of the described embodiments, which are directed to a method and apparatus for coding or decoding a block of video data. In at least one embodiment, it is proposed to use a convolutional neural network to generate a vector of split partition probabilities.

According to at least one general embodiment described herein, there is provided a method for coding a block of video data. The method comprises comparing horizontal and vertical pairs of motion vectors around a sub-block of a video coding block, respectively, with a current motion vector for the sub-block to check for differences; filtering a pixel of a prediction of said sub-block using pixels from at least one neighboring sub-block prediction with different motion vectors and a prediction using said current motion vector to generate a prediction for the sub-block; and, encoding said sub-block using said filtered prediction.

According to at least one general embodiment described herein, there is provided a method for decoding a block of video data. The method comprises comparing horizontal and vertical pairs of motion vectors around a sub-block of a video coding block, respectively, with a current motion vector for the sub-block to check for differences; filtering a pixel of a prediction of said sub-block using pixels from at least one neighboring sub-block prediction with different motion vectors and a prediction using said current motion vector to generate a prediction for the sub-block; and decoding said sub-block using said filtered prediction.

According to another general embodiment described herein, there is provided an apparatus for coding a block of video data. The apparatus comprises a memory, and a processor, configured to compare horizontal and vertical pairs of motion vectors around a sub-block of a video coding block, respectively, with a current motion vector for the sub-block to check for differences; filter a pixel of a prediction of said sub-block using pixels from at least one neighboring sub-block prediction with different motion vectors and a prediction using said current motion vector to generate a prediction for the sub-block; and, encode said sub-block using said filtered prediction.

According to another general embodiment described herein, there is provided an apparatus for coding a block of video data. The apparatus comprises a memory, and a processor, configured to compare horizontal and vertical pairs of motion vectors around a sub-block of a video coding block, respectively, with a current motion vector for the sub-block to check for differences; filter a pixel of a prediction of said sub-block using pixels from at least one neighboring sub-block prediction with different motion vectors and a prediction using said current motion vector to generate a prediction for the sub-block; and, decode said sub-block using said filtered prediction.

According to another aspect described herein, there is provided a nontransitory computer readable storage medium containing data content generated according to the method of any one of the described method embodiments, or by the apparatus of any one of the described apparatus embodiments for playback using a processor.

According to another aspect described herein, there is provided a signal comprising video data generated according to the method of any one of the described method embodiments for coding a block of video data, or by the apparatus of any one of the described apparatus embodiments for coding a block of video data, for playback using a processor.

According to another aspect described herein, there is provided a computer program product comprising instructions which, when the program is executed by a computer, cause the computer to carry out the method of any one of the described method embodiments.

These and other aspects, features and advantages of the present principles will become apparent from the following detailed description of exemplary embodiments, which is to be read in connection with the accompanying drawings.

DETAILED DESCRIPTION

An approach is described for improved entropy coding efficiency of video signals. In particular, an improved approach to OBMC (Overlapped Block Motion Compensation) is described.

In the HEVC video compression standard, motion compensated temporal prediction is employed to exploit the redundancy that exists between successive pictures of a video.

Figure 1:
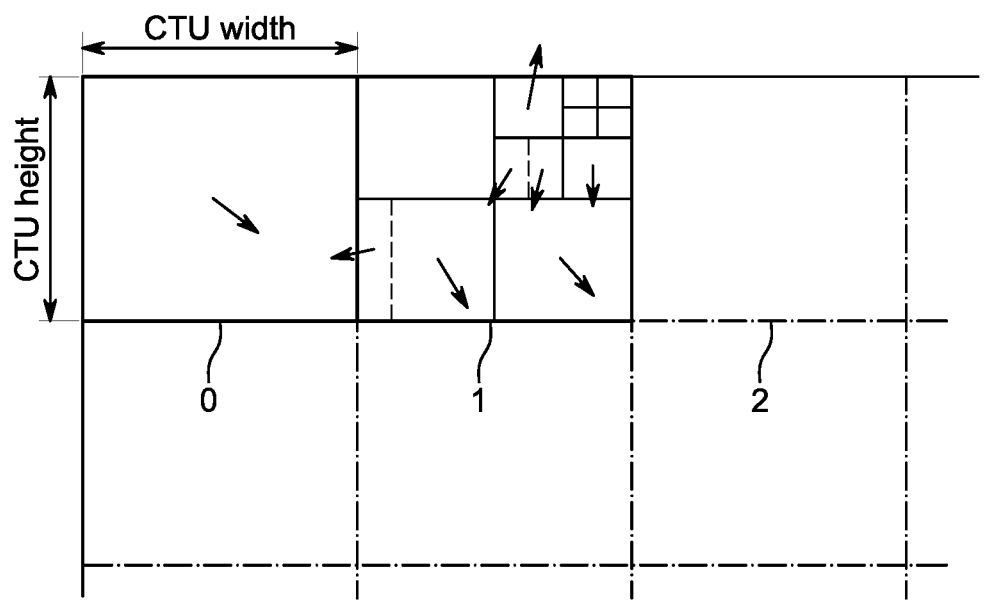
FIG. 1 illustrates one example of a coding tree unit and coding tree concepts to represent a compressed picture.

To do, a motion vector is associated to each prediction unit (PU), which is now introduced. Each CTU is represented by a Coding Tree in the compressed domain. This is a quad-tree division of the CTU, where each leaf is called a Coding Unit (CU), see FIG. 1.

Figure 2:
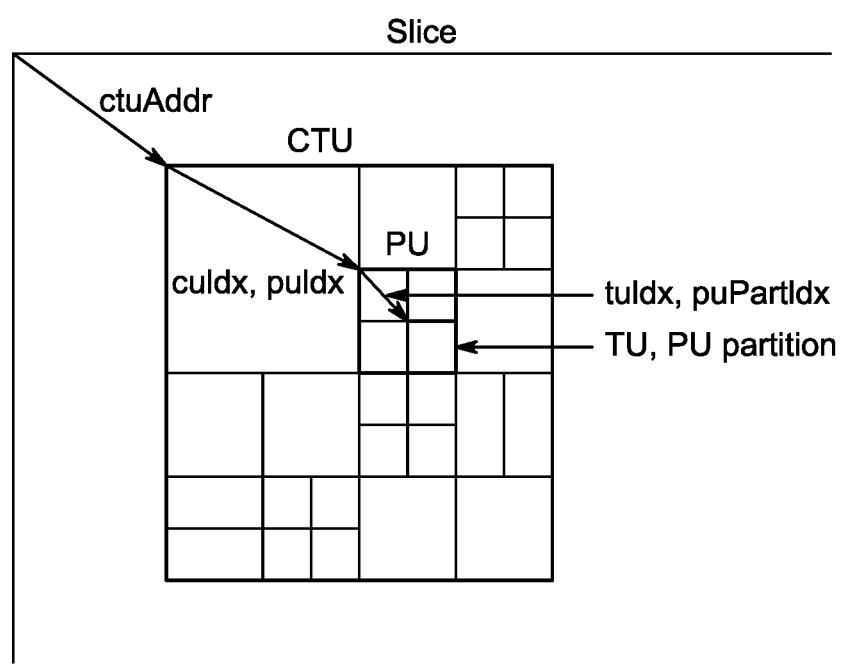
FIG. 2 illustrates an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Exactly one motion vector is assigned to each PU in HEVC. This motion vector is used for motion compensated temporal prediction of the considered PU.

In the Joint Exploration Model (JEM) developed by the JVET (Joint Video Exploration Team) group, a CU is no more divided into PU or TU, and some motion data is directly assigned to each CU. In this new codec design, a CU can be divided into sub-CU and a motion vector can be computed for each sub-CU.

In the JEM, the motion compensation step is followed, for all Inter CUs whatever their coding mode, by a process called OBMC for Overlapped Block Motion Compensation that aims at attenuating the motion transitions between CUs (somehow like the deblocking filter with the blocking artifacts). But, depending on the CU coding mode, the OBMC method applied is not the same. Two distinct processes exist, one for CUs that are divided into smaller parts (affine, FRUC, . . . ), and one for the other CUs (entire ones).

The present approach proposes to generalize the process of the OBMC tool which is performed at the encoder and decoder side right after the motion compensation inter prediction process.

The problem solved by the approach is how to generalize the OBMC process for all CUs, to simplify the design and increase the overall compression performance of the considered video codec.

In the state-of-the-art approach, CUs that are divided into sub-parts do not follow the same OBMC process than CUs not divided (entire ones).

The basic idea of the proposed approach is to generalize for all CUs the OBMC process performed after the motion compensation inter prediction.

The smoothed prediction operations are described with respect to Overlapped Block Motion Compensation (OBMC). OBMC operates at a sub-block level of size 4×4 pixels. In the figures, the full block is a coding unit (CU) and the small squares are 4×4 sub-blocks.

At each step, the process constructs two predictions, Pc and Pn, where a prediction is the corresponding sub-block compensated (with the motion compensation, i.e. a sub-block picked from a reference picture using a motion vector) with the current CU motion vector (Pc) and the motion vector from a neighboring sub-block (Pn).

Then, the current prediction (Pc) is smoothed using the other prediction (Pn), to give the new current prediction.

For example, if Pn has been obtained with a left neighboring motion vector, then the first left column of pixels will become Pc'=¾Pc+¼Pn, the second column Pc'=⅞Pc+⅛ Pn, . . . .

So, in the figures, the striped lines correspond to the direction of the smoothing. If they fill the 4×4 sub-block, it means that 4 lines/columns are filtered, if they only fill half of the sub-block, it means that only 2 lines/columns are filtered. The stripes themselves do not represent the number of lines/columns of pixels.

One main difference between the prior art OBMC and the generalized OBMC process is in the way the number of lines/columns of pixels to be filtered is defined.

In the prior art, it is set a-priori for all directions from the coding mode of the current coding unit. If the coding unit is divided into sub-blocks, 2 lines/columns are filtered with each neighbor, and if the entire coding unit is processed as one entity, 4 lines/columns are filtered, except if the area of the coding unit is less than 64, filtering is done on 2 lines/columns.

In an embodiment of the generalized OBMC, this number can be different for each direction and for each sub-block. It is defined from two opposite neighbors, if both are available with a different motion vector than the one for the current sub-block, then 2 lines/columns are filtered from each neighbor, if only one is available, then 4 lines/columns are filtered from this available neighbor. And if none are available, or both motion vectors are equal to the current sub-block motion vector, no filtering is applied.

For example, when testing horizontal, the left and right MVs from left and right sub-blocks (of the current one) are retrieved if possible, and if both MVs are different from the current motion vector of the current sub-block, then the first left column of pixels of the current sub-block will become Pc'=¾Pc+¼$P_L$ and the second column Pc'=⅞Pc+⅛$P_L$, and the last column of pixels will become Pc'=¾Pc+¼$P_R$ and the third column Pc'=⅞Pc+⅛$P_R$.

Furthermore, in the prior art OBMC, if the area of the current CU is less than 64 (4×4, 8×4, 4×8), it forces the number of pixels to be filtered to 2.

This restriction limits the filtering when the coding unit is not large. For example, for a 4×4 CU, there is only one sub-block, and without this criterion, all lines and columns will be filtered from left then top, which can be a bit too much. With this criterion, only two lines and columns will be filtered.

Figure 14:
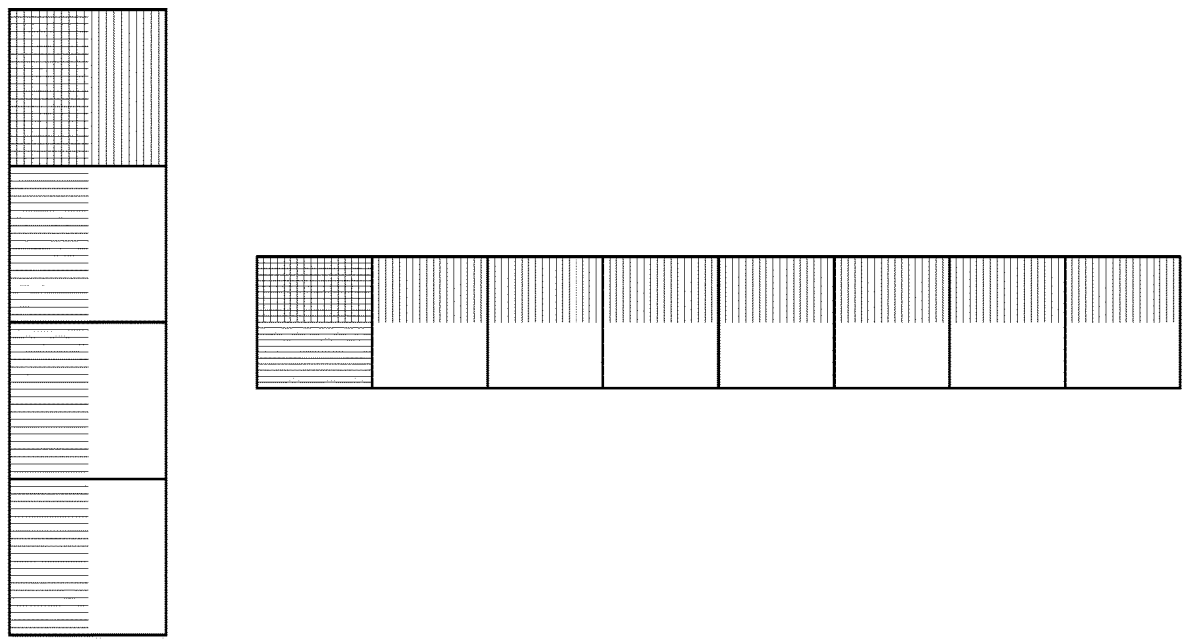
FIG. 14 illustrates an example of the proposed OBMC process for thin coding units.
Figure 15:
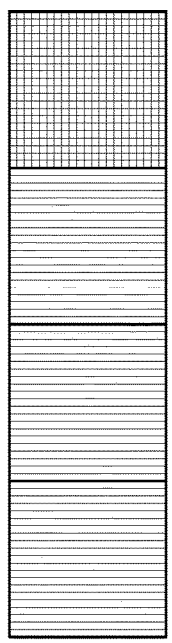
FIG. 15 illustrates a corresponding prior art OBMC process for thin coding units.
Figure 15:
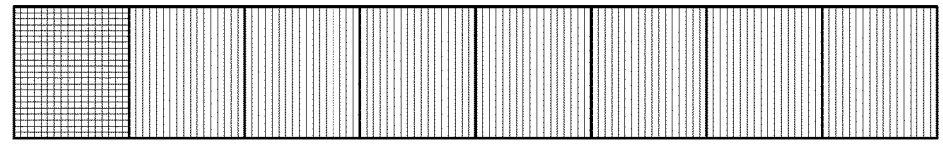

But some CU with a larger area than 64 can have a size of 4 pixels in a direction (4×16, 16×4, 4×32, 32×4, . . . ), as in the proposed generalized OBMC, the number of pixels to be filtered can be set differently for each direction, and it is possible to modify this area criterion to be a size criterion depending on the direction. If a CU has a size smaller than 8 in a direction, then the number of pixels to be smoothed in this direction can be forced to be 2, and in the other direction it can be 4, as shown on FIG. 14. FIG. 15 shows the prior art with too much filtering.

The proposed embodiments include, among other.
  Generalize the OBMC process for all CUs whatever their coding mode. [encoder/decoder]
  Adapt process for thin CUs. [encoder/decoder]
  Speed-up the process for some particular CUs. [encoder/decoder]

Figure 3:
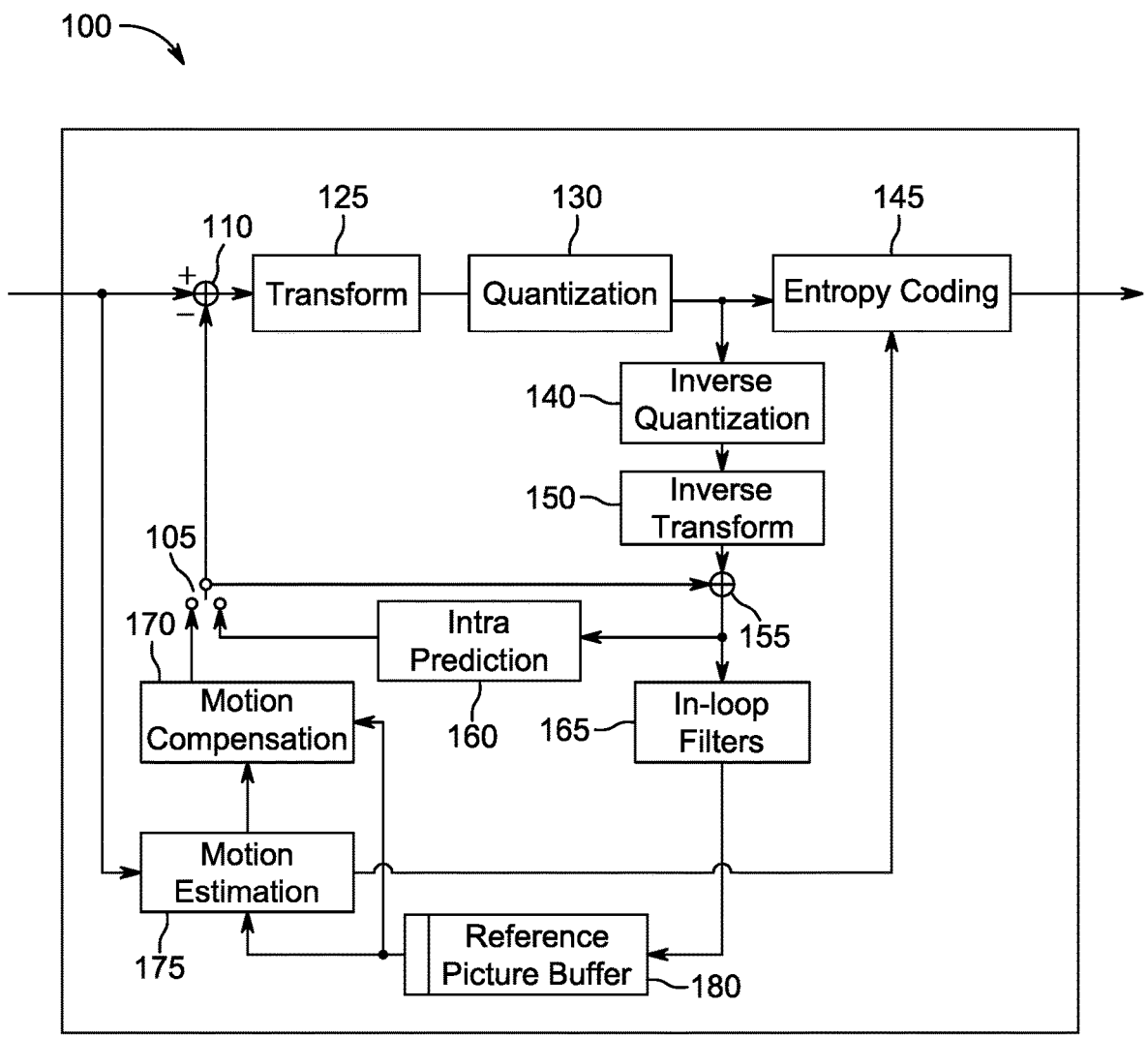
FIG. 3 illustrates a standard, generic video compression scheme.
Figure 4:
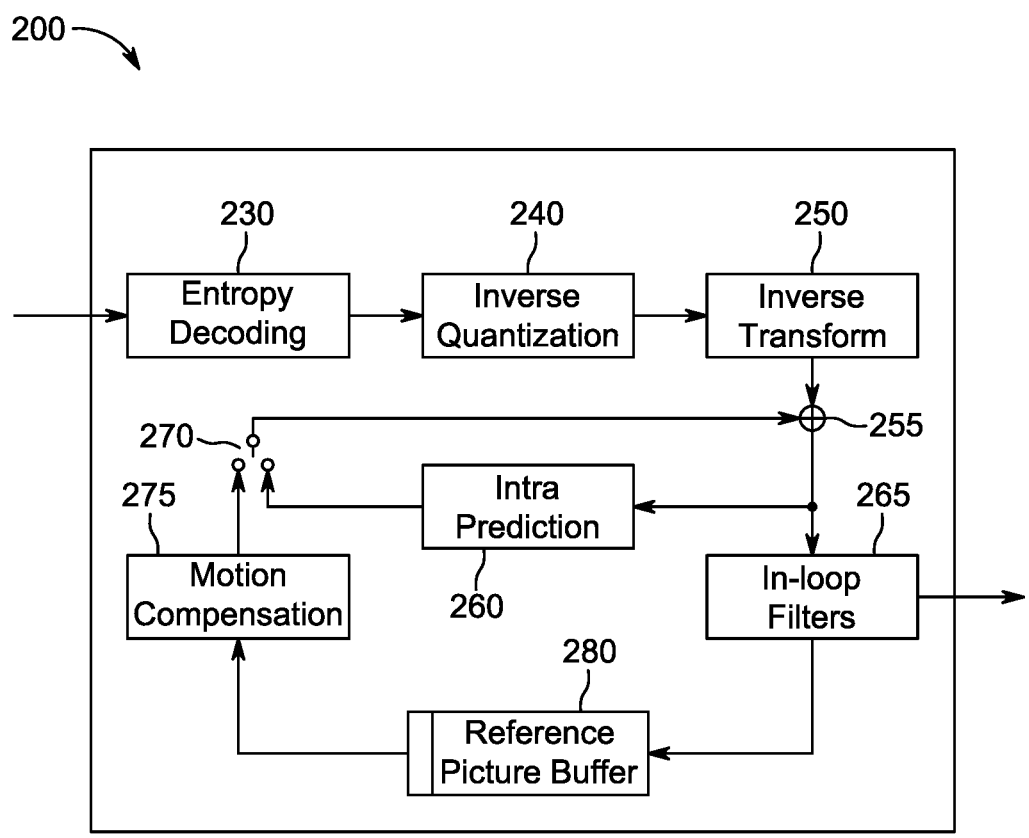
FIG. 4 illustrates a standard, generic video decompression scheme.

The impacted codec modules are the motion compensation 170 and the motion estimation 175 of FIG. 3 and 275 of FIG. 4.

OBMC (Overlapped Block Motion Compensation) aims at reducing the motion transitions between CUs and inside those which are divided into sub-blocks.

In the state-of-the-art, the first step of the OBMC process consists in detecting the kind of CU to filter, either entire or divided into sub-blocks. By default, the incoming CU is considered as entire. In the actual JEM, CU divided into sub-blocks are coded using: merge mode with ATMVP/STMVP predictor, FRUC merge mode or Affine mode.

The following OBMC process applied to these two kinds of CUs is then different.

Figure 5:
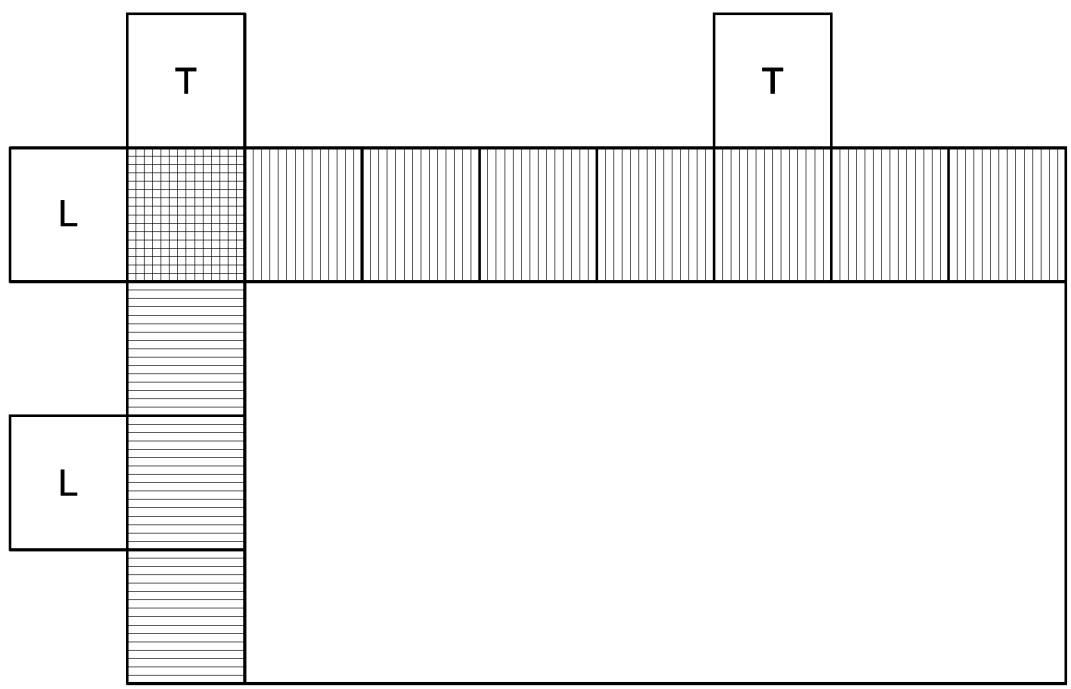
FIG. 5 illustrates a prior art OBMC applied on a 32×16 entire INTER coding unit.

According to the state of the art, for entire CUs, the motion transitions occur on the top and left borders (bottom and right are not already coded/decoded), so for these CUs OBMC is only applied on the top row and left column of 4×4 sub-blocks as shown in FIG. 5, which is prior art OBMC applied on a 32×16 entire INTER coded Coding Unit.

By denoting $P_c$, a current 4×4 sub-block prediction obtained with the motion compensation of the current CU and using the motion vector of this current CU, and $P_n$, with n in top (T) or left (L), the corresponding 4×4 sub-block prediction obtained with the neighboring 4×4 sub-block motion vector. $P_n$ exists and OBMC can be applied on the current 4×4 sub-block only if the neighboring 4×4 sub-block exists with a different motion vector from the current one.

For each 4×4 sub-block, the current prediction $P_c$ is then filtered using the available predictions $P_n$ to smooth the motion transition.

The 4 lines and/or columns of pixels of $P_n$ are added to the current prediction $P_c$ using the weighting factors $\{1/4, 1/8, 1/16, 1/32\}$ for $P_n$ and $\{3/4, 7/8, 15/16, 31/32\}$ for $P_c$.

If the current CU area is less than 64 (4×4, 8×4 and 4×8 CUs), then only the two first lines/columns of pixels are filtered using the two first weighting factors.

Figure 6:
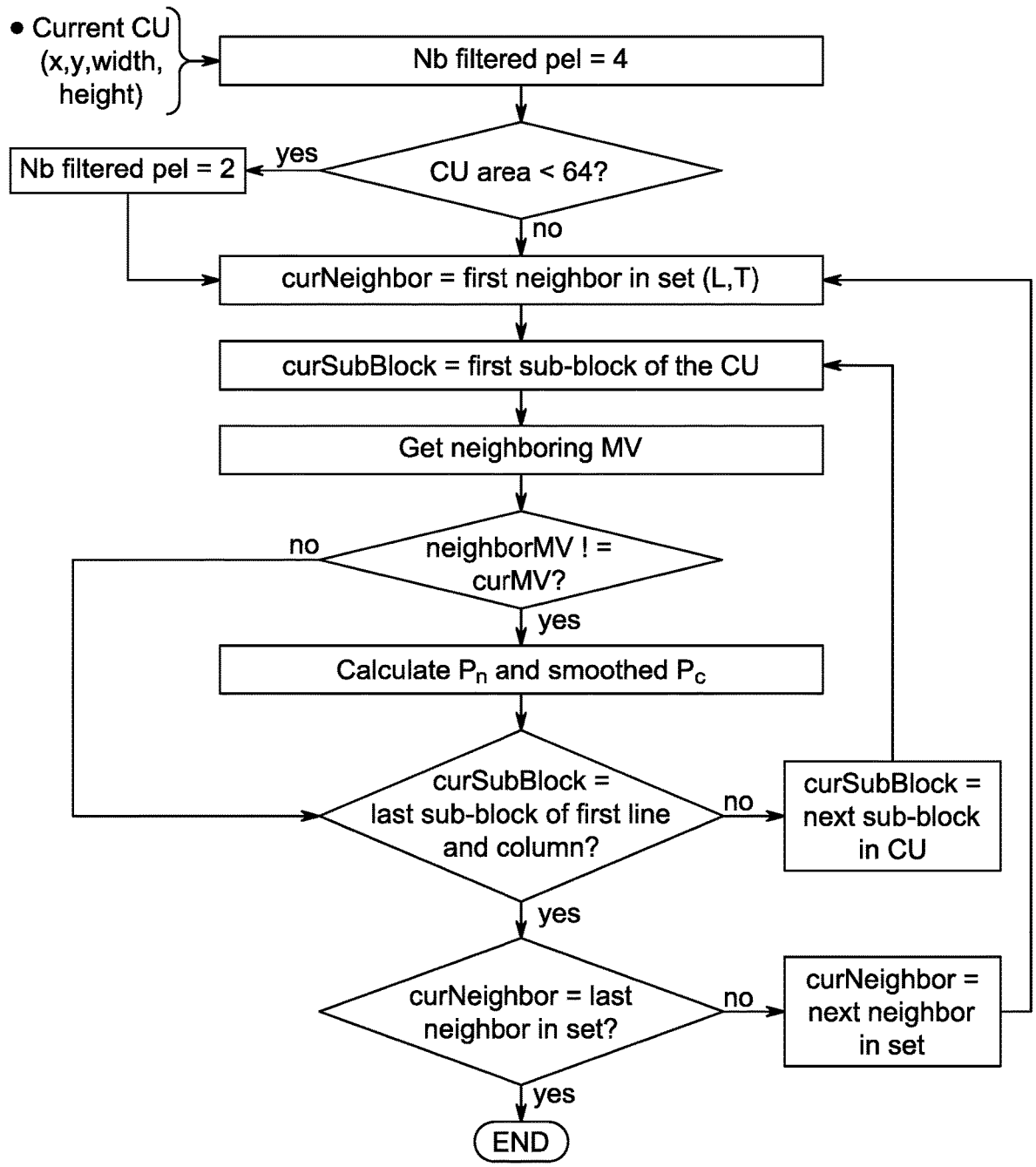
FIG. 6 illustrates a prior art OBMC process for entire INTER coding unit.

Since several pixels are sequentially filtered several times, in the first 4×4 sub-block, the result depends on the usage order of the different neighbors. For that point, OBMC filters from left then top which implies that $P_c$ becomes:

$P_c$---$P_L$→$P_c'$---$P_T$→$P_c''$ for first 4×4 sub-block
$P_c$---$P_L$→$P_c'$ for all other sub-block of the first column
$P_c$---$P_T$→$P_c''$ for all other sub-block of the first line The whole OBMC process for entire CUs is as shown in FIG. 6.

Figure 7:
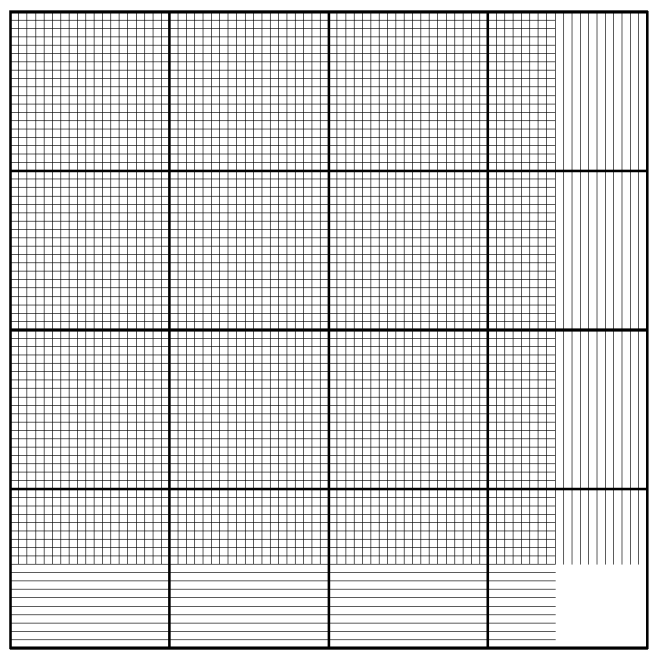
FIG. 7 illustrates a prior art OBMC applied on a 16×16 divided INTER coding unit.

According to the state of the art, for CUs divided into sub-blocks, the motion transitions occur between every sub-block and at the top and left borders, so for these CUs OBMC is applied on each 4×4 sub-block as shown in FIG. 7, which shows state of the art OBMC applied on a 32×16 entire INTER coded Coding Unit.

In this case, $P_n$ can be obtained from 4 different neighbors, top (T), left (L), bottom (B) and right (R) neighboring sub-blocks, if available (from a causal CU or from the current CU, and with a motion vector different from the current one).

For each 4×4 sub-block, the current prediction $P_c$ is then filtered using all the available predictions $P_n$ to smooth the motion transitions.

The 2 first lines or columns of pixels of each sub-block are the weighted sum of the current prediction $P_c$ and $P_n$ from top or left neighboring sub-blocks respectively. The 2 last lines or columns of pixels of each sub-block use $P_n$ from the bottom or right neighboring sub-block respectively. The weighting factors used here are $\{1/4, 1/8\}$ for $P_n$ and $\{3/4, 7/8\}$ for $P_c$.

Figure 8:
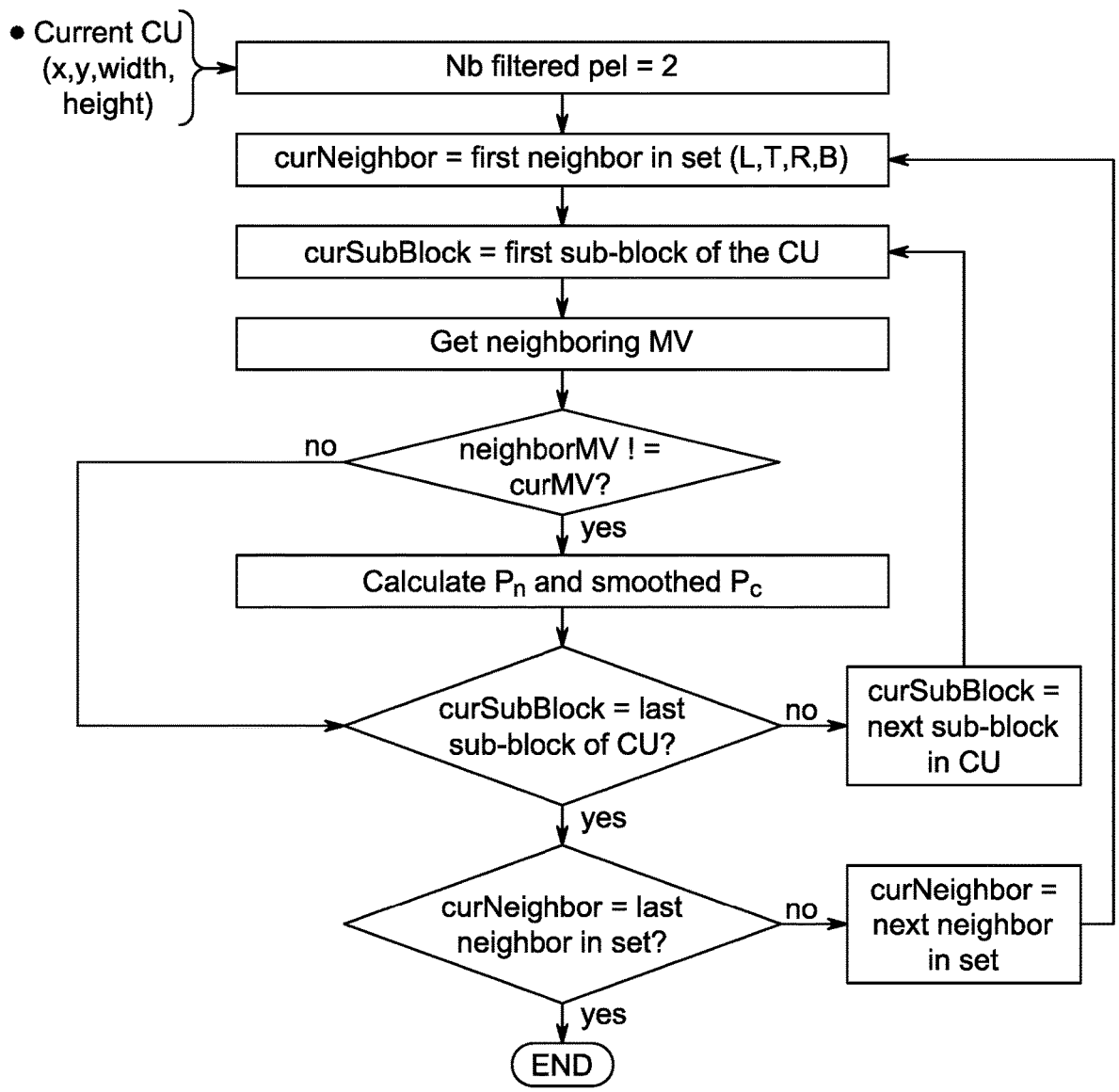
FIG. 8 illustrates a prior art OBMC process for divided INTER coding unit.

Since nearly all the pixels are sequentially filtered several times, the result depends on the usage order of the different neighbors. For that point, OBMC filters from left, top then right and bottom which implies that $P_c$ becomes:

$P_c$---$P_L$→$P_c'$---$P_T$→$P_c''$---$P_R$→$P_c'''$---$P_B$→$P_c''''$ for all 4×4 sub-blocks except the last row and column
$P_c$---$P_L$→$P_c'$---$P_T$→$P_c''$---$P_R$→$P_c'''$ for the last row of 4×4 sub-blocks except the last 4×4 sub-block
$P_c$---$P_L$→$P_c'$---$P_T$→$P_c''$---$P_B$→$P_c'''$ for the last column of 4×4 sub-blocks except the last 4×4 sub-block
$P_c$---$P_L$→$P_c'$---$P_T$→$P_c''$ for the last 4×4 sub-block The OBMC process for these CUs divided into sub-blocks is then as shown in FIG. 8.

The main limitation of this tool is that it need to detect if the CU to process is divided into sub-blocks or not, and consider it, by default, as entire.

Indeed, when a new coding mode is added, it is considered, by default, as entire. In that case and if it divides CUs into sub-blocks, then it goes to the classification error presented below in FIG. 9.

Figure 9:
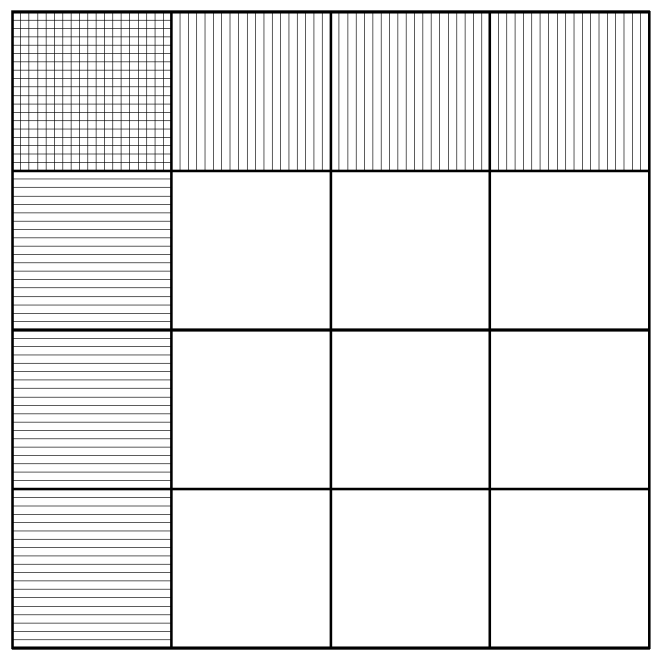
FIG. 9 illustrates a prior art OBMC applied on a 16×16 divided INTER coding unit detected as an entire coding unit.

And, if a CU divided into sub-blocks is not well classified, then only the first line and column of sub-blocks will be filtered but with 4 rows/columns of pixels as shown in FIG. 9 instead of the result of FIG. 7.

Figure 10:
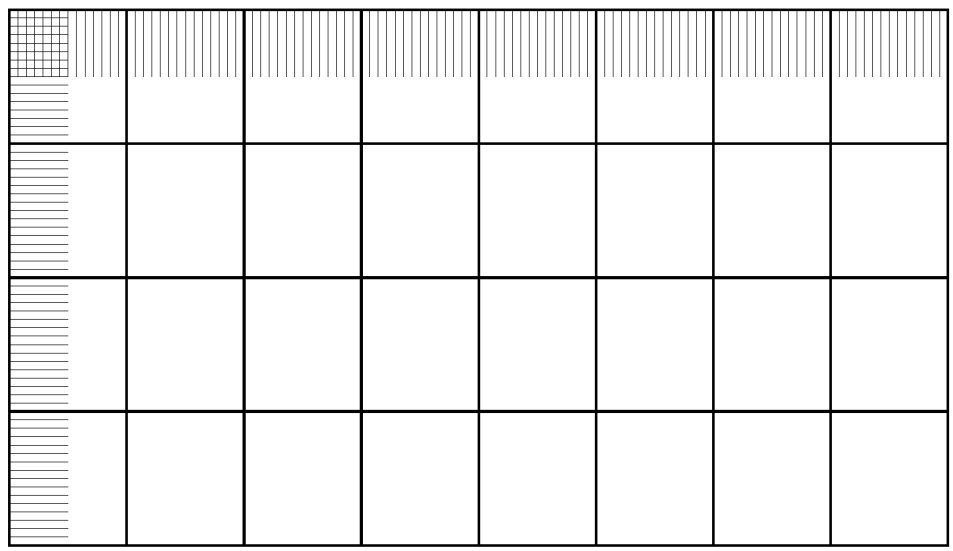
FIG. 10 illustrates a prior art OBMC applied on a 32×16 entire INTER coding unit detected as divided into sub-blocks.

In the same way, if an entire CU is classified as divided into sub-blocks, then all sub-blocks will be processed. As all the motion vectors inside the current CU have the same value, then OBMC will only filter the first line and column of sub-blocks, but only two rows/columns of pixels will be smoothed as presented in the following FIG. 10 instead of the correct result of FIG. 5.

So, when a CU is not well classified, the OBMC process followed is different and the result also.

Each time an existing tool is modified and goes from one category to the other or a new tool is added, OBMC has to be modified to correctly classify the CU, otherwise it will go to a sub-optimal process.

The following paragraphs describe the generalized OBMC process proposed in this approach.

The proposed solution does not need to classify the CU for the same result as the state-of-the-art OBMC, and it is not limited by the area of the CU.

The proposed approach is based on the state-of-the-art OBMC process for CUs divided into sub-blocks where all the surrounding neighbors are considered.

In the proposed generalized OBMC process, the four neighboring sub-blocks are checked by pairs, left-right and top-bottom, i.e. horizontal and vertical, but are still used sequentially to smooth the current prediction.

For each 4×4 sub-block of a current coding unit and each direction, both neighboring motion vectors are retrieved if available, i.e. if they exist with a different motion vector as the one for the current sub-block.

If both neighboring motion vectors are available, then the number of pixels to be filtered along this tested direction is set to 2. That is, the first two lines or columns will be filtered with the first neighbor, and the last two lines or columns with the second neighbor. And if only one neighboring motion vector is available, it is set to 4 pixels. That is, 4 lines/columns will be filtered with this neighbor. If none are available, OBMC is still not applicable.

The sub-block is then smoothed sequentially using the available neighboring motion vectors and its (their) associated $P_n$ and the same weighted factors as for the state-of-the-art OBMC ($\{1/4, 1/8, 1/16, 1/32\}$ for $P_n$ and $\{3/4, 7/8, 15/16, 31/32\}$ for $P_c$). These weights are applied from the tested neighbor to its opposite; for left, from left to right and for top, from top to bottom, for right, from right to left.

In the proposed solution, the neighbors are studied by directional pairs, left-right and top-bottom. This allows selecting the number of lines or columns of pixels to be smoothed as 2 or 4 instead of setting this number, a priori, depending on the CU coding mode.

The OBMC process smooths the motion transition by filtering the current prediction, so the proposed solution described here slightly modifies the current prediction of each sub-block of the coding unit.

Furthermore, it is important to notice that this solution allows choosing the number of smoothed lines/columns in each direction independently, and that they can be different. This allows a better fitting to the motion transitions in CUs like those coded in a Merge ATMVP/STMVP mode as shown in FIG. 12 compared to prior art OBMC in FIG. 13.

In this example, the 8×16 partition on the right side is exactly smoothed as if it is an independent CU with the generalized OBMC process while this is not the case with the state-of-the-art OBMC.

The output of the generalized OBMC process is the same as with the state-of-the-art OBMC, for entire CUs as presented in FIG. 5, and for CUs fully divided into sub-blocks (Affine, FRUC) as presented in FIG. 7.

Figure 12:
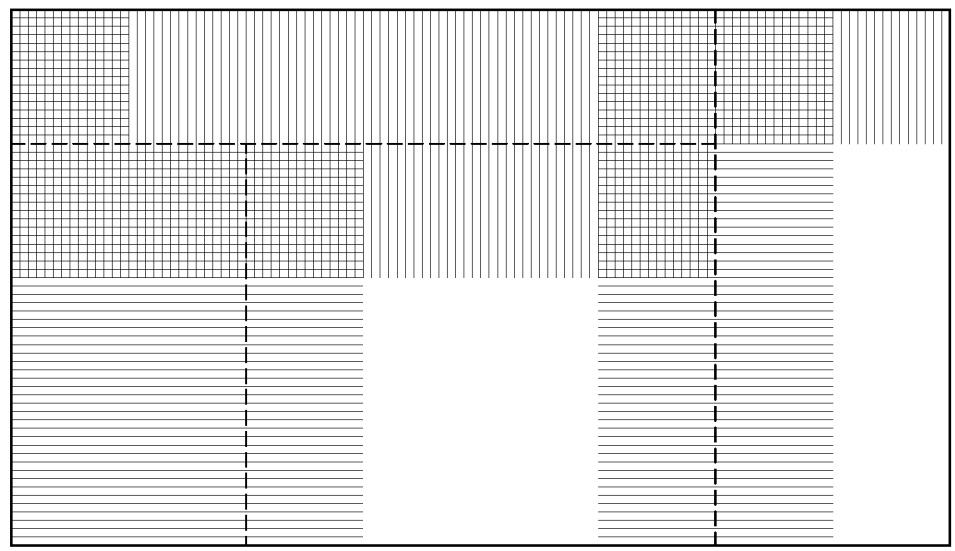
FIG. 12 illustrates an example for a proposed generalized OBMC applied on a 32×16 INTER coding unit in Merge ATMVP mode.
Figure 13:
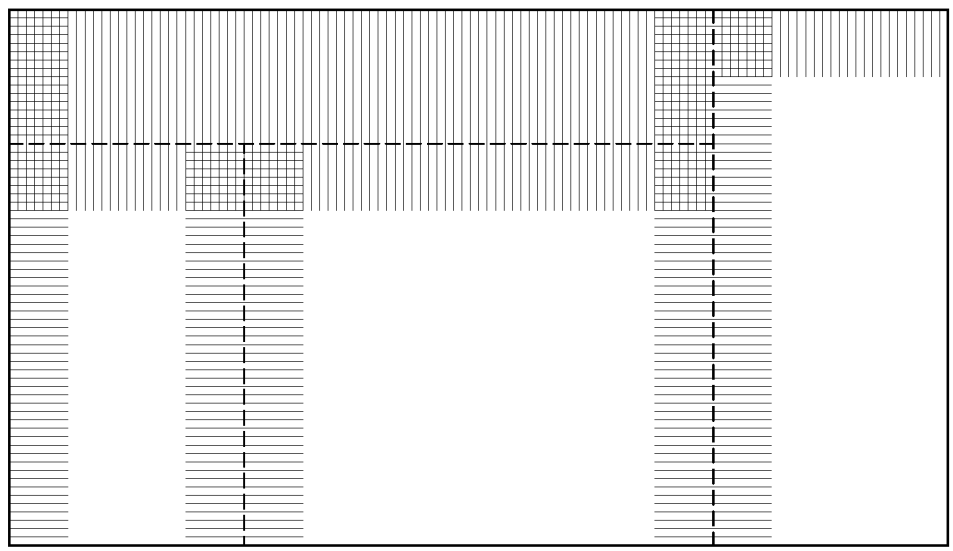
FIG. 13 illustrates a corresponding prior art OBMC applied on a 32×16 INTER coding unit in Merge ATMVP mode.

The only difference in the results can be observed for CUs that are not fully divided into sub-blocks as those coded with a Merge ATMVP/STMVP mode as presented in FIG. 12.

In the state-of-the-art OBMC, when the CU area is less than 64, only two lines/columns of pixels are filtered.

This concept can also be generalized in the new proposed OBMC process.

For each pair of neighbors, if the corresponding size of the CU (width for horizontal or height for vertical) is smaller than 8, then the number of pixels to be filtered is forced to be 2. A thin CU can then be filtered along 2 lines and 4 columns of pixels or vice versa as presented in FIG. 14.

This generalized criterion also allows a better fitting to the motion transitions compared to the state-of-the-art OBMC that filters only 2 pixels for CUs smaller than 64 (4×4, 8×4 and 4×8) and 4 pixels for larger ones (4×16, 16×4, 4×32, 32×4, . . . ) where the full width or height is smoothed as presented in FIG. 15.

The complexity of the proposed generalized OBMC is higher than the prior art OBMC since it checks the 4 neighbors for all sub-blocks of all CUs while they are only checked for CUs divided into sub-blocks in the prior art OBMC.

To speed-up the process of the generalized OBMC, it is possible to use the same kind of classification as used in the state-of-the-art OBMC.

The classification used here isolates the entire CUs (instead of the CUs divided into sub-blocks) and consider, by default, the incoming CU as divided into sub-blocks (instead of entire). This reversed classification limits the errors linked to bad detections since the error from FIG. 9 still can be observed, but the one from FIG. 10 cannot occur anymore. Moreover, when a new coding mode is added, it is considered, by default, as divided into sub-blocks and if it uses entire CUs, then it goes to the bad classification presented in FIG. 10 that do not generate a different OBMC result here. So, when a coding mode goes from entire to divided, OBMC has to be modified, but when it goes from divided to entire or when a new coding mode is added, the OBMC result is the same, only the complexity can be reduced by informing OBMC.

After classification, entire CUs goes to a simplified and faster OBMC process where only the first line and column of sub-blocks are filtered using only the first neighbor of each pair (the opposite neighbor is always considered unavailable).

Figure 11:
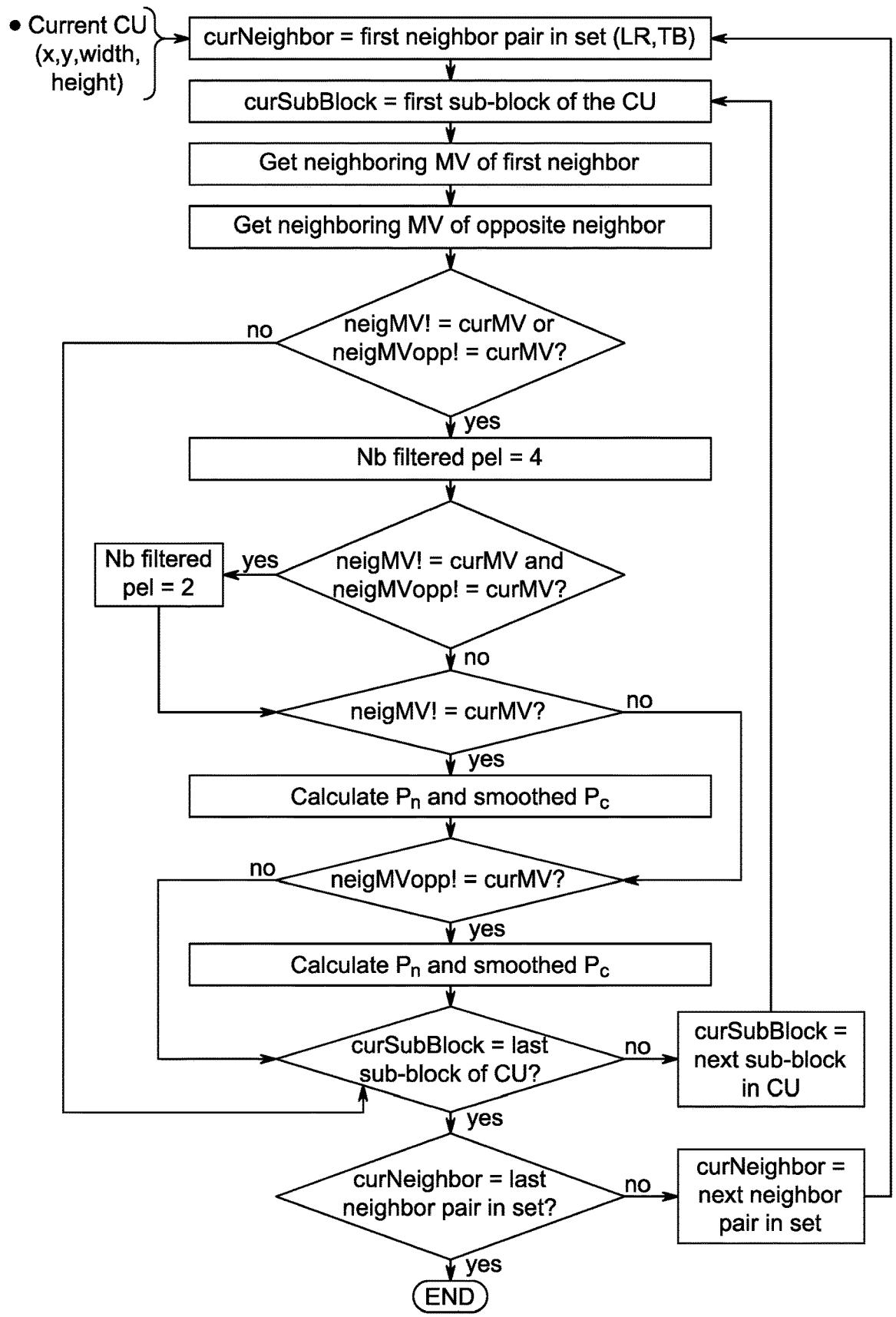
FIG. 11 illustrates one embodiment of the proposed generalized OBMC process for all INTER coding unit.
Figure 16:
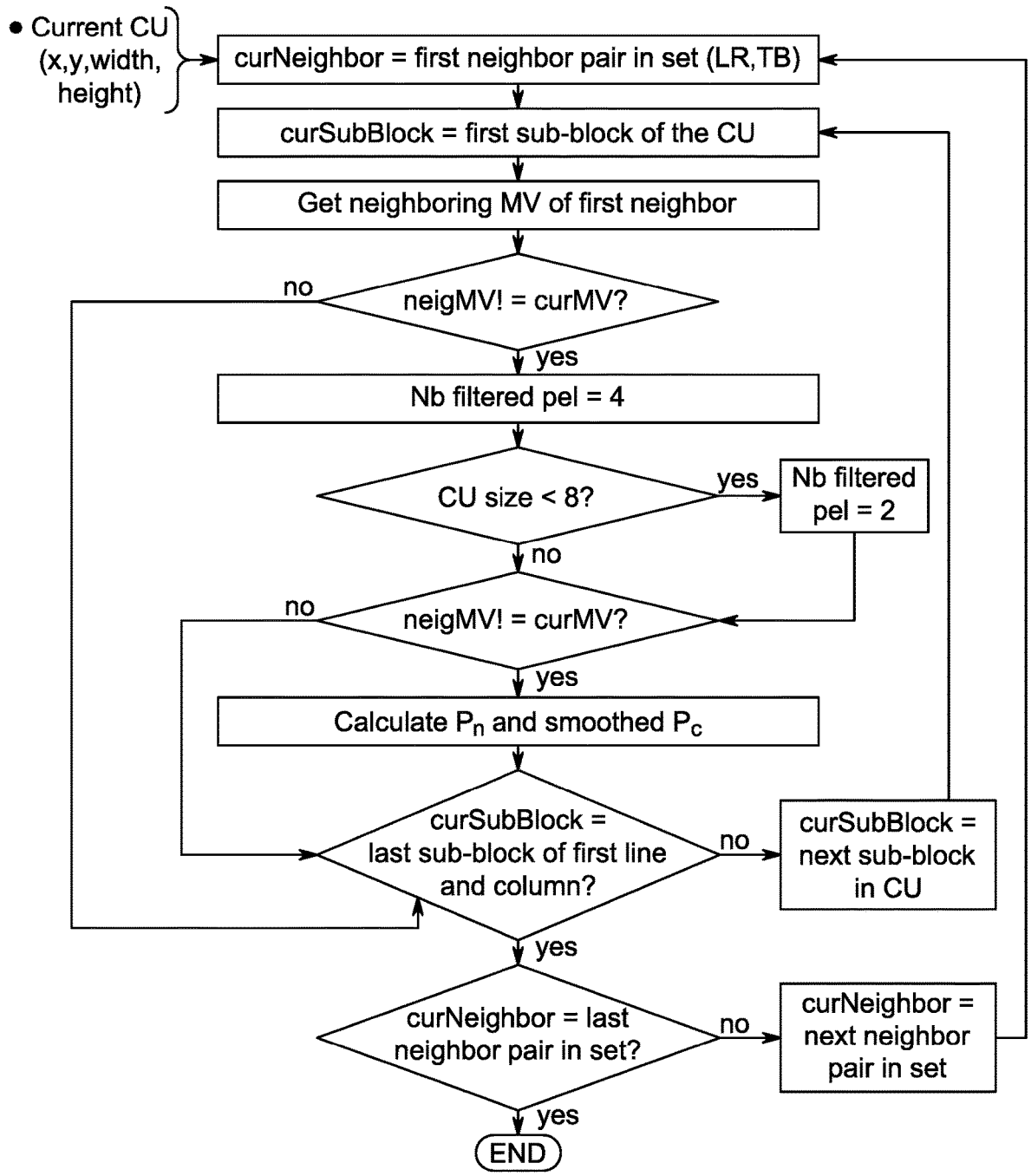
FIG. 16 illustrates an example embodiment of the proposed generalized OBMC process for entire INTER coding units.

The OBMC process for CUs classified as entire becomes as described in FIG. 16, and the one for the other CUs remains the one presented in FIG. 11.

In one preferred embodiment, the three proposed improvements of OBMC are used: the generalized process with the generalized criterion for thin CUs and the simplified version for the entire CUs.

Figure 17:
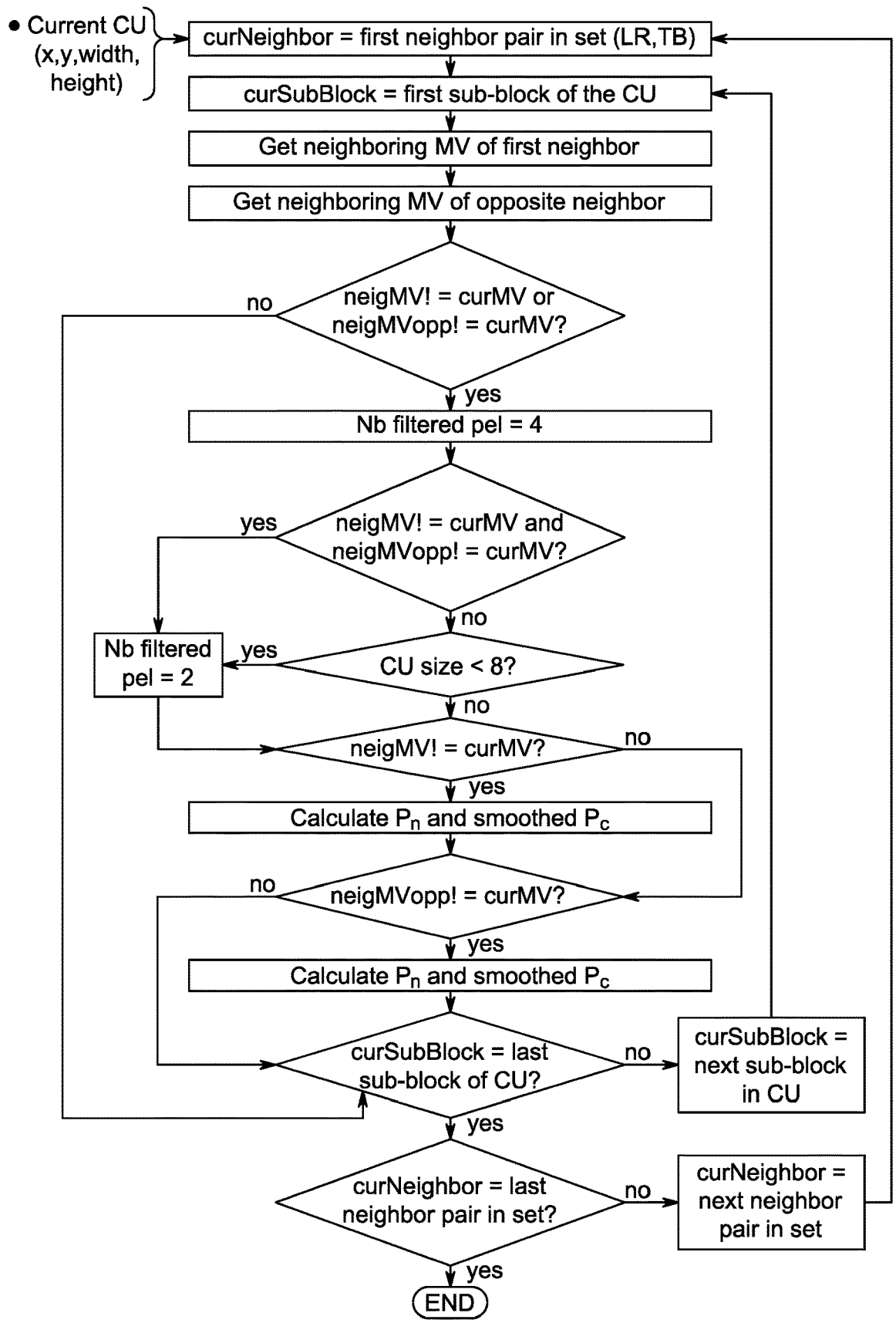
FIG. 17 illustrates an example embodiment of a proposed generalized OBMC process for all INTER coding units.

The process for entire CUs is described in FIG. 16, and for the other CUs it is described by FIG. 11 with the additional thin CUs management as presented in FIG. 17.

The smoothed prediction operations are described with respect to Overlapped Block Motion Compensation (OBMC), but can be generalized to other prediction methods.

At each step, the process constructs two predictions, Pc and Pn, where a prediction is the corresponding sub-block compensated (with the motion compensation, i.e. a sub-block picked from a reference picture using a motion vector) with the current CU motion vector (Pc) and the motion vector from a neighboring sub-block (Pn).

Then, the current prediction (Pc) is smoothed using the other prediction (Pn), to give the new current prediction.

One main difference between the prior art OBMC and the generalized OBMC process is in the way the number of lines/columns of pixels to be filtered is defined.

In the prior art, it is set a-priori for all directions from the coding mode of the current coding unit. If the coding unit is divided into sub-blocks, 2 lines/columns are filtered with each neighbor, and if the entire coding unit is processed as one entity, 4 lines/columns are filtered, except if the area of the coding unit is less than 64, filtering is done on 2 lines/columns.

In an embodiment of the generalized OBMC, this number can be different for each direction and for each sub-block. It is defined from two opposite neighbors, if both are available with a different motion vector than the one for the current sub-block, then 2 lines/columns are filtered from each neighbor, if only one is available, then 4 lines/columns are filtered from this available neighbor.

Furthermore, in the prior art OBMC, if the area of the current CU is less than 64 (4×4, 8×4, 4×8), it forces the number of pixels to be filtered to 2.

This restriction limits the filtering when the coding unit is not large. For example, for a 4×4 CU, there is only one sub-block, and without this criterion, all lines and columns will be filtered from left then top, which can be a bit too much. With this criterion, only two lines and columns will be filtered.

But some CU with a larger area than 64 can have a size of 4 pixels in a direction (4×16, 16×4, 4×32, 32×4, ...), as in the proposed generalized OBMC, the number of pixels to be filtered can be set differently for each direction, and it is possible to modify this area criterion to be a size criterion depending on the direction. If a CU has a size smaller than 8 in a direction, then the number of pixels to be smoothed in this direction is forced to be 2, and in the other direction it can be 4, as shown on FIG. 14. FIG. 15 shows the prior art with too much filtering.

An OBMC design can be lightened by not computing illumination compensation (IC) parameters for each OBMC 4XS band but inheriting IC parameters from neighboring 4×4 sub-blocks. For this purpose, the IC parameters of the current picture are stored with the motion field information at a 4×4 sub-block resolution.

The aforementioned embodiments have been described with respect to an encoder or encoding operation. A decoder would simply interpret the splits generated at an encoder using the described embodiments in the same way as splits generated with an RDO process, or any other type of splitting embodiment.

Figure 18:
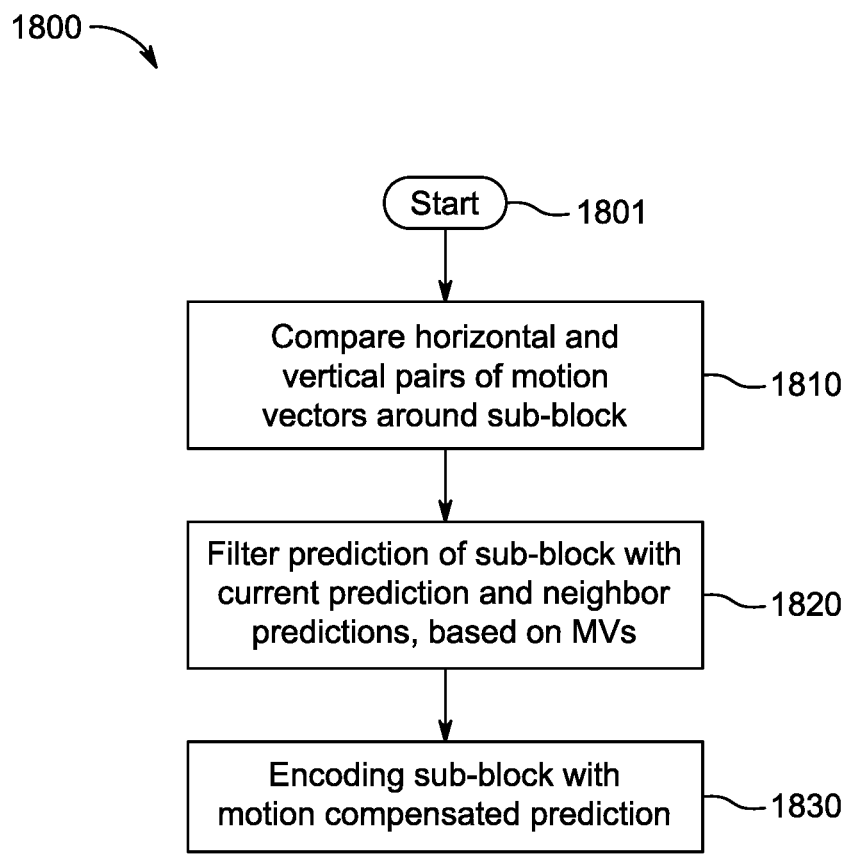
FIG. 18 illustrates one embodiment of the proposed OBMC method for an encoder.

FIG. 18 shows one embodiment of a method 1800 for coding a block of video data. The method commences at Start block 1801 and proceeds to block 1810 for comparing horizontal and vertical pairs of motion vectors around a sub-block. The sub-block can be part of a larger block to be encoded. The method compares the motion vectors of neighboring sub-blocks to the current motion vector for the sub-block. Control proceeds from block 1810 to block 1820 for filtering a prediction of the sub-block using the current prediction for the sub-block with neighboring predictions of sub-blocks with motion vectors that are different than the current motion vector for the sub-block to generate a smoothed prediction of the current sub-block. Control proceeds from block 1820 to block 1830 for encoding the sub-block using the smoothed prediction for the sub-block.

Figure 19:
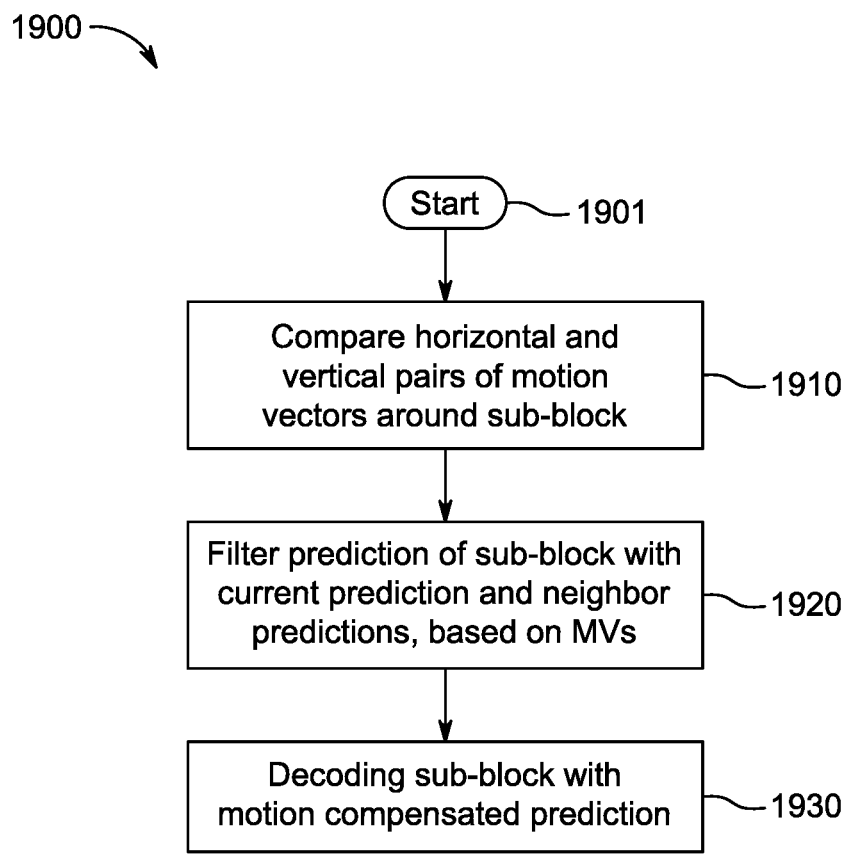
FIG. 19 illustrates one embodiment of the proposed OBMC method for an decoder.

FIG. 19 shows one embodiment of a method 1900 for coding a block of video data. The method commences at Start block 1901 and proceeds to block 1910 for comparing horizontal and vertical pairs of motion vectors around a sub-block. The sub-block can be part of a larger block to be decoded. The method compares the motion vectors of neighboring sub-blocks to the current motion vector for the sub-block. Control proceeds from block 1910 to block 1920 for filtering a prediction of the sub-block using the current prediction for the sub-block with neighboring predictions of sub-blocks with motion vectors that are different than the current motion vector for the sub-block to generate a smoothed prediction of the current sub-block. Control proceeds from block 1920 to block 1930 for decoding the sub-block using the smoothed prediction for the sub-block.

Figure 20:
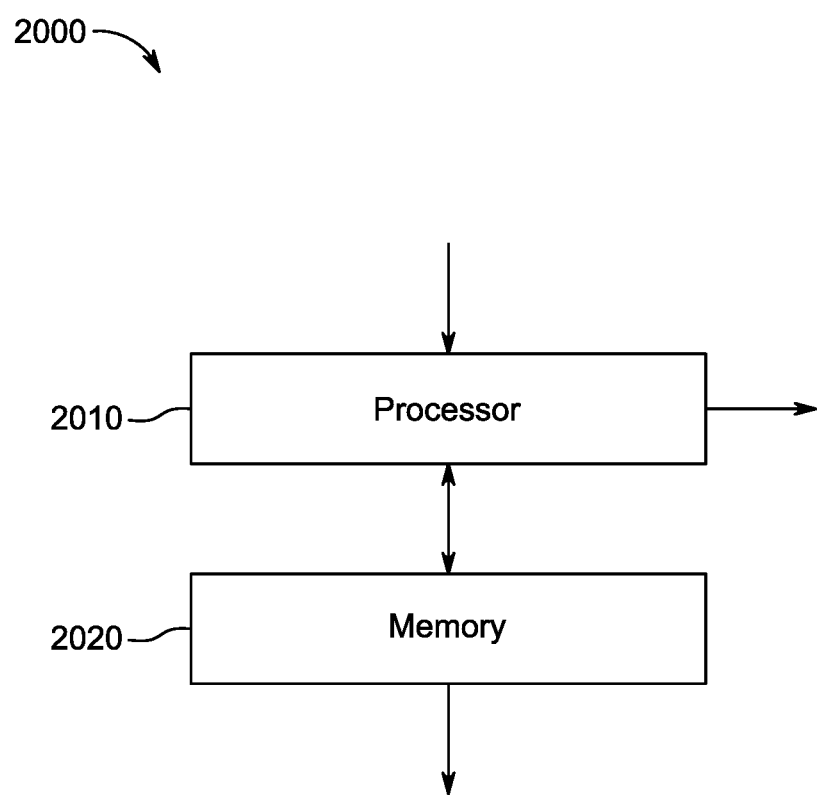
FIG. 20 illustrates one embodiment of an apparatus for the proposed OBMC process.

FIG. 20 shows one embodiment of an apparatus 2000 for coding or decoding a block of video data. The apparatus comprises Processor 2010 which has input and output ports and is in signal connectivity with Memory 2020, also having input and output ports. The apparatus can execute either of the aforementioned method embodiments, or any variations thereof.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method, comprising:
   determining whether motion vectors of horizontally and vertically neighboring sub-blocks of a current sub-block of a video coding block are different than a motion vector for the current sub-block, wherein the determining is based on checking the neighboring sub-blocks by pairs of neighboring sub-blocks and the pairs of neighboring sub-blocks include a first pair of horizontally neighboring sub-blocks left and right of the current sub-block and a second pair of vertically neighboring sub-blocks above and below the current sub-block;
   filtering prediction pixels of said neighboring sub-blocks having different motion vectors than said current sub-block motion vector along with a current prediction of the current sub-block to generate a filtered prediction for the sub-block, wherein a number of prediction pixels to be filtered is set different for each direction and for each sub-block and can be set depending on size of each direction;
   and if two opposite neighbors are available with different motion vector than a motion vector for a current sub-block, then two lines/columns are filtered from each neighbor and if one is available, then four lines/columns are filtered from the available neighbor; and encoding said sub-block using said filtered prediction.

2. A non-transitory computer readable medium containing data content generated according to the method of claim 1, for playback.

3. An apparatus for coding a block of video data, comprising:
   a memory, and
   a processor, configured to:
   determine whether motion vectors of horizontally and vertically neighboring sub-blocks of a current sub-block of a video coding block are different than a motion vector for the current sub-block, wherein the determining is based on checking the neighboring sub-blocks by pairs of neighboring sub-blocks and the pairs of neighboring sub-blocks include a first pair of horizontally neighboring sub-blocks left and right of the current sub-block and a second pair of vertically neighboring sub-blocks above and below the current sub-block;
   filter prediction pixels of said neighboring sub-blocks having different motion vectors than said current sub-block motion vector along with a current prediction of the current sub-block to generate a filtered prediction for the sub-block, wherein a number of prediction pixels to be filtered is set differently for each direction and for each sub-block and can be set depending on size of each direction;
   and if two opposite neighbors are available with different motion vector than a motion vector for a current sub-block, then two lines/columns are filtered from each neighbor and if one is available, then four lines/columns are filtered from the available neighbor; and encode said sub-block using said filtered prediction.

4. A method, comprising:
   determining whether motion vectors of horizontally and vertically neighboring sub-blocks of a current sub-block of a video coding block are different than a motion vector for the current sub-block, wherein the determining is based on checking the neighboring sub-blocks by pairs of neighboring sub-blocks and the pairs of neighboring sub-blocks include a first pair of horizontally neighboring sub-blocks left and right of the current sub-block and a second pair of vertically neighboring sub-blocks above and below the current sub-block;
   filtering prediction pixels of said neighboring sub-blocks having different motion vectors than said current sub-block motion vector along with a current prediction of the current sub-block to generate a filtered prediction for the sub-block, wherein a number of prediction pixels to be filtered is set differently for each direction and for each sub-block and can be set depending on size of each direction;
   and if two opposite neighbors are available with different motion vector than a motion vector for a current sub-block, then two lines/columns are filtered from each neighbor and if one is available, then four lines/columns are filtered from the available neighbor; and decoding said sub-block using said filtered prediction.

5. The method of claim 4, wherein the filtering comprises using a prediction from a left or a top sub-block for two first pixels or two first lines, respectively, of the sub-block being predicted.

6. The method of claim 5, wherein the two first pixels or two first lines of said sub-block prediction are filtered using a prediction from a left or a top neighboring sub-block, respectively, when a size of a block comprising said sub-block is less than a particular size.

7. The method of claim 4, wherein the filtering comprises using a prediction from a right or a bottom sub-block for two last pixels or two last lines, respectively, of the sub-block being predicted.

8. The method of claim 4, wherein the filtering comprises using one neighboring sub-block prediction when another one of said corresponding horizontal or vertical pairs of motion vectors is the same as the motion vector of said sub-block.

9. The method of claim 4, wherein the filtering comprises using a prediction from a left or a top sub-block for a first pixel or first line, respectively, of the sub-block being predicted.

10. The method of claim 4, wherein the filtering comprises using a prediction from a right or a bottom sub-block for a last pixel or last line, respectively, of the sub-block being predicted.

11. The method of claim 4, wherein the filtering comprises two pixels or two lines of a sub-block being filtered for predictions corresponding to blocks comprising said sub-block larger than a particular size and one pixel or one line being filtered for predictions corresponding to blocks comprising said sub-block smaller than a particular size.

12. The method of claim 4, wherein said current sub-block is part of a coding unit.

13. An apparatus for coding a block of video data, comprising:
a memory, and
a processor, configured to:
determine whether motion vectors of horizontally and vertically neighboring sub-blocks of a current sub-block of a video coding block are different than a motion vector for the current sub-block, wherein the determining is based on checking the neighboring sub-blocks by pairs of neighboring sub-blocks and the pairs of neighboring sub-blocks include a first pair of horizontally neighboring sub-blocks left and right of the current sub-block and a second pair of vertically neighboring sub-blocks above and below the current sub-block;
filter prediction pixels of said neighboring sub-blocks having different motion vectors than said current sub-block motion vector along with a current prediction of the current sub-block to generate a filtered prediction for the sub-block, wherein a number of prediction pixels to be filtered is set differently for each direction and for each sub-block and can be set depending on size of each direction;
and if two opposite neighbors are available with different motion vector than a motion vector for a current sub-block, then two lines/columns are filtered from each neighbor and if one is available, then four lines/columns are filtered from the available neighbor; and
decode said sub-block using said filtered prediction.

14. The apparatus of claim 13, wherein the filtering comprises using a prediction from a left or a top sub-block for two first pixels or two first lines, respectively, of the sub-block being predicted.

15. The apparatus of claim 14, wherein the two first pixels or two first lines of said sub-block prediction are filtered using a prediction from a left or a top neighboring sub-block, respectively, when a size of a block comprising said sub-block is less than a particular size.

16. The apparatus of claim 13, wherein the filtering comprises using a prediction from a right or a bottom sub-block for two last pixels or two last lines, respectively, of the sub-block being predicted.

17. The apparatus of claim 13, wherein the filtering comprises using one neighboring sub-block prediction when another one of said corresponding horizontal or vertical pairs of motion vectors is the same as the motion vector of said sub-block.

18. The apparatus of claim 13, wherein the filtering comprises using a prediction from a left or a top sub-block for a first pixel or first line, respectively, of the sub-block being predicted.

19. The apparatus of claim 13, wherein the filtering comprises using a prediction from a right or a bottom sub-block for a last pixel or last line, respectively, of the sub-block being predicted.

20. The apparatus of claim 13, wherein the filtering comprises two pixels or two lines of a sub-block being filtered for predictions corresponding to blocks comprising said sub-block larger than a particular size and one pixel or one line being filtered for predictions corresponding to blocks comprising said sub-block smaller than a particular size.

* * * * *